United States Patent [19]

Furuhata et al.

[11] Patent Number: 4,954,902
[45] Date of Patent: Sep. 4, 1990

[54] TRACKING CONTROL METHOD AND DEVICE IN ROTARY HEAD TYPE MAGNETIC RECORDING AND REPRODUCING APPARATUS

[75] Inventors: Takashi Furuhata; Kenji Satoh, both of Yokohama, Japan

[73] Assignee: Hitachi, Ltd., Tokyo, Japan

[21] Appl. No.: 336,620

[22] Filed: Apr. 10, 1989

Related U.S. Application Data

[63] Continuation of Ser. No. 932,377, Nov. 20, 1986, abandoned.

[30] Foreign Application Priority Data

Nov. 20, 1985 [JP] Japan .................... 60-258528

[51] Int. Cl.[5] ............................................. G11B 15/00
[52] U.S. Cl. .................... 360/10.2; 360/73.03; 360/77.12
[58] Field of Search ........ 358/317, 320, 521, 337–339; 360/9.1, 10.1, 10.2, 10.3, 70, 75, 33.1, 73.03, 77.12

[56] References Cited

U.S. PATENT DOCUMENTS

| | | | |
|---|---|---|---|
| 3,959,815 | 5/1976 | Rotter | 360/70 |
| 4,139,867 | 2/1979 | Foerster | 360/36.1 |
| 4,184,181 | 1/1980 | Mijatovic | 360/70 |
| 4,206,485 | 6/1980 | Sakamoto | 360/70 |
| 4,541,020 | 9/1985 | Kimura | 360/9.1 |
| 4,594,616 | 6/1986 | Dischert | 360/36.1 |

FOREIGN PATENT DOCUMENTS

| | | | |
|---|---|---|---|
| 102600 | 3/1984 | European Pat. Off. | |
| 89407 | 8/1978 | Japan | 360/77 |
| 66559 | 4/1982 | Japan | 360/77 |

OTHER PUBLICATIONS

Abstract of JP 57-172562, Oct. 82.
Abstract of JP 57-66559, Apr. 82.
Abstract of JP 58-126638, Jul. 83.

Primary Examiner—Aristotelis M. Psitos
Attorney, Agent, or Firm—Antonelli, Terry, Stout & Kraus

[57] ABSTRACT

A tracking control device for use in a rotary magnetic head type magnetic recording/reproducing apparatus, having a device for generating synchronizing signals in synchronism with the rotation of rotary magnetic heads, at a recording mode, records on a magnetic tape original information signals time-base converted so that the synchronizing information included in the information signals is in a predetermined synchronizing relation with said synchronizing signals, together with said synchronizing information; and at a reproduction mode of the recorded information, time-base converts the information signals and synchronizing information to restore the original information and controls the relative speed between the magnetic tape and rotary magnetic heads so that the time of the phase difference between the synchronizing signals and the reproduced synchronizing information is a predetermined value.

15 Claims, 11 Drawing Sheets

F I G. 5
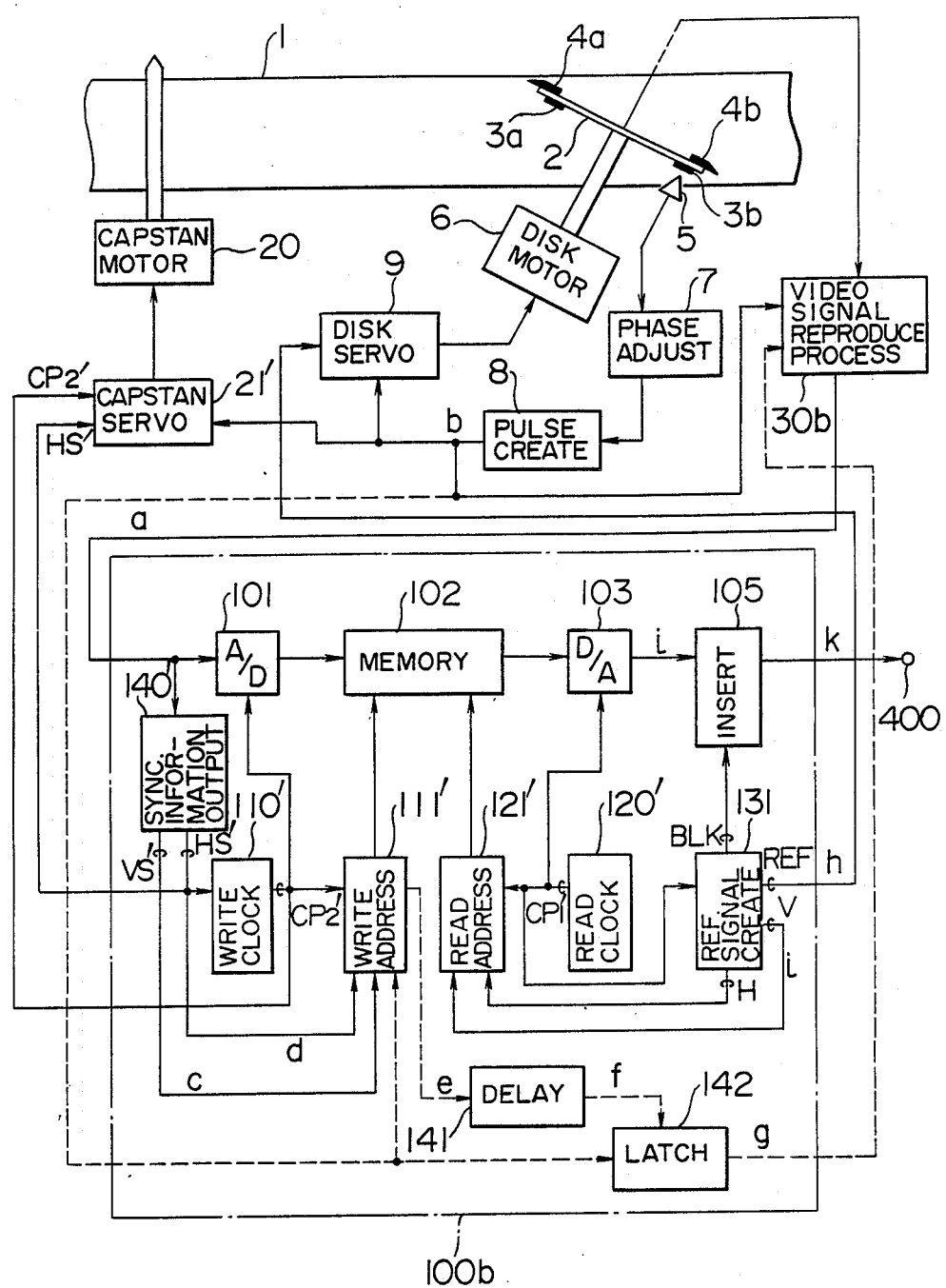

F I G. 10
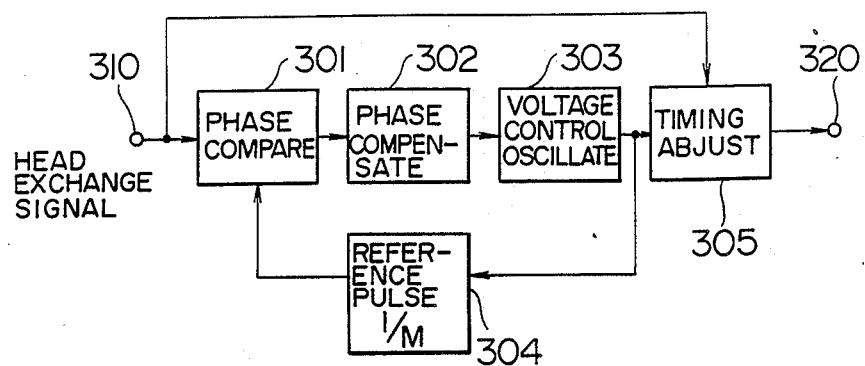
F I G. 13
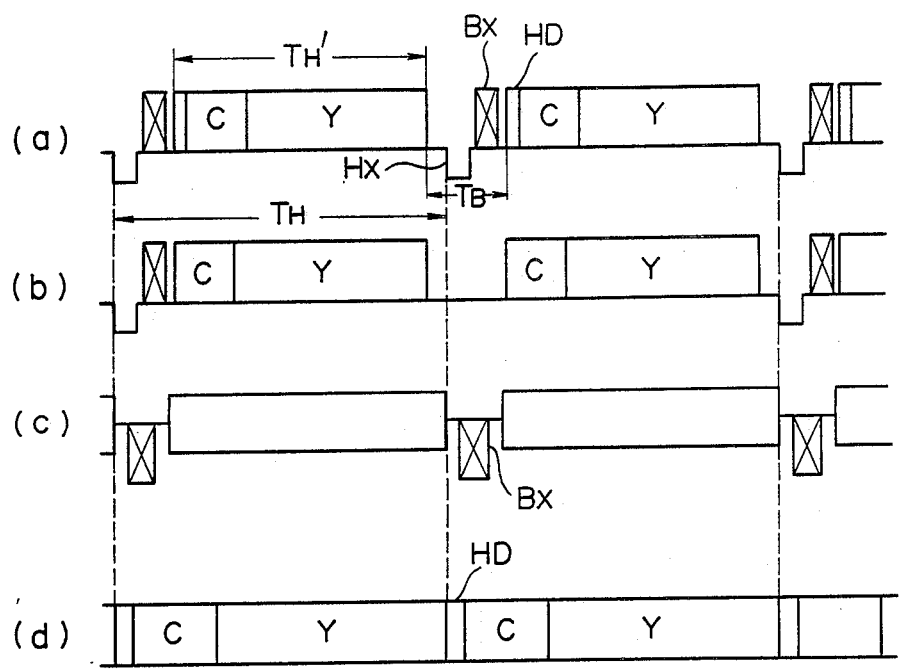

F I G. 11
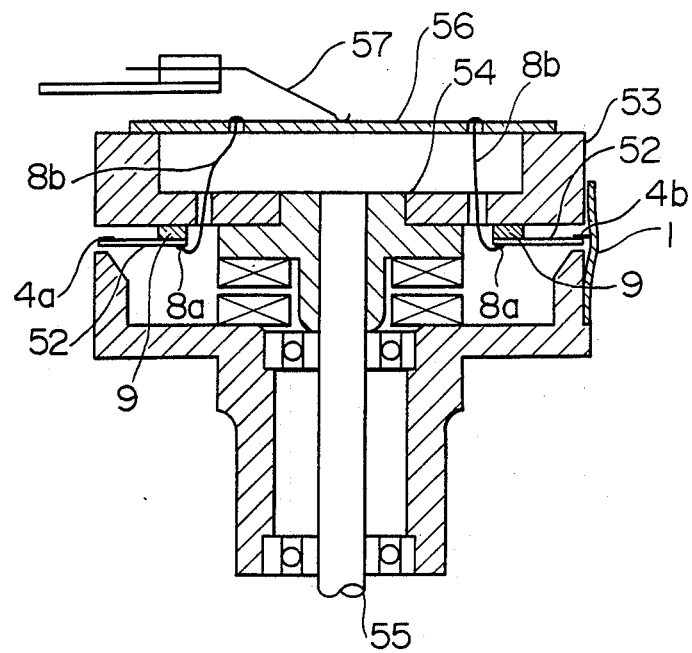
F I G. 12
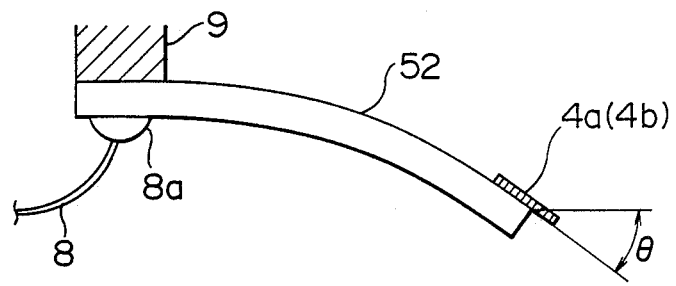

TRACKING CONTROL METHOD AND DEVICE IN ROTARY HEAD TYPE MAGNETIC RECORDING AND REPRODUCING APPARATUS

This application is a continuation of application Ser. No. 932,377, filed Nov. 20, 1986, now abandoned.

BACKGROUND OF THE INVENTION

This invention relates to a method and device for controlling the tracking in a rotary head type magnetic recording/reproducing apparatus.

One example of a tracking control method in a magnetic recording and reproducing apparatus using a rotary magnetic head, such as a VTR, etc. is disclosed in JP-A-53-89407.

In this conventional tracking control method, at a recording mode, video signals are recorded on a video track in such a way that the vertical synchronizing signals of the video signals to be recorded and a disk tach pulses (hereinafter referred to as DTP) generated in synchronism with the rotation of a magnetic head are controlled by a servo control device used when recording the video signals so that they are in a predetermined phase relation. At a reproduction mode, tracking control is performed so that the magnetic head correctly scans the video track by controlling the rotating speed of the magnetic head so that fixed is the time corresponding to the phase difference between the vertical synchronizing signals, separated from the video signals reproduced from the video track, and the DTP's.

However, the servo control device at a recording mode, mentioned above has an essential problem that the rotating speed and rotating phase of the magnetic head of recording video signals vary for several reasons and so the vertical synchronizing signal is not record on a fixed position, which results in the variation of the recording position thereof; the above several reasons include the variations or changes of the load torque of a motor which rotates the magnetic head, power supply voltage in a servo circuit system, environmental temperature and humidity, elapse of time, etc.

Therefore, if the recorded tape is tracking-controlled by the conventional technique mentioned above, the time corresponding to the phase difference between the vertical synchronizing signals and the DTP's will include a variation error as well as a true tracking error; this variation error corresponds to the variation during recording and is irrelevant to the tracking error. Then, the control device acts to fix the tracking error including the variation error to a certain value so that a new tracking error will be produced. Further, if the variation during recording is too large, the control system is out of its operation range, thereby making the tracking control impossible and the system unstable.

Moreover, the variation during recording includes a stationary position deviation depending upon the rotation phase deviation of the magnetic head. This position deviation also is generally too large to ignore, and its value is different for each device, thereby making the reproduction by the exchange of the device very difficult.

There has been proposed another tracking control method in JP-A-57-66559. In this method, index signals created synchronously with the DTP signal are recorded so as to be inserted during the vertical blanking interval of the video signal, and using the index signals the tracking control is performed during reproducing. This method can remove the influence from the variation and deviation at a recording mode. However, since the number of the index signals which can be recorded for detecting the tracking errors is essentially limited, the sampling rate of detecting the tracking errors can not be sufficiently enhanced, thereby making difficult the tracking control at a higher precision or accuracy.

SUMMARY OF THE INVENTION

An object of this invention is to obviate the drawbacks of the prior art techniques as mentioned above and to provide a tracking control device which can perform tracking control in an always stabilized manner immune from any variation of the rotating speed and rotating phase which may be produced at recording and reproduction modes, and with a sufficient sampling rate providing a high accuracy or precision, thereby making possible the stabilized signal reproduction.

In order to attain this object, in accordance with this invention, information signals including synchronizing information are divisionally recorded so that they are allotted to the corresponding plural tracks, and in recording the information signals, they are time-base converted so as to be synchronized with the rotation of magnetic heads for each track. During reproduction, the synchronizing information signals are separated from the information signal reproduced from each track, and the tracking control is performed so that the phase difference between the separated synchronizing information signals and the pulses created synchronously with the rotation of the magnetic heads. Thus, the information signals reproduced from each track are time-base converted to provide continuation of their phases, thereby restoring the original information signals.

A more complete understanding of this invention can be attained by considering the following detailed description in conjunction with the accompanying drawings in which all corresponding parts of the various figures are designated by the same numerals or letters.

BRIEF DESCRIPTION OF THE DRAWINGS

FIG. 5 is a block diagram showing an information signal reproducing device according to this invention;

FIG. 10 is a block diagram of one embodiment of the reference pulse creation circuit according to this invention;

FIG. 11 is a sectional view showing a perturbation mechanism in the tracking control circuit according to this invention;

FIG. 12 is an enlarged view of a main portion of the mechanism of FIG. 11; and,

FIG. 13 consisting of (a)-(d) is a waveform chart showing another system of video signals in accordance with this invention.

DESCRIPTION OF THE PREFERRED EMBODIMENTS

Figure 1:
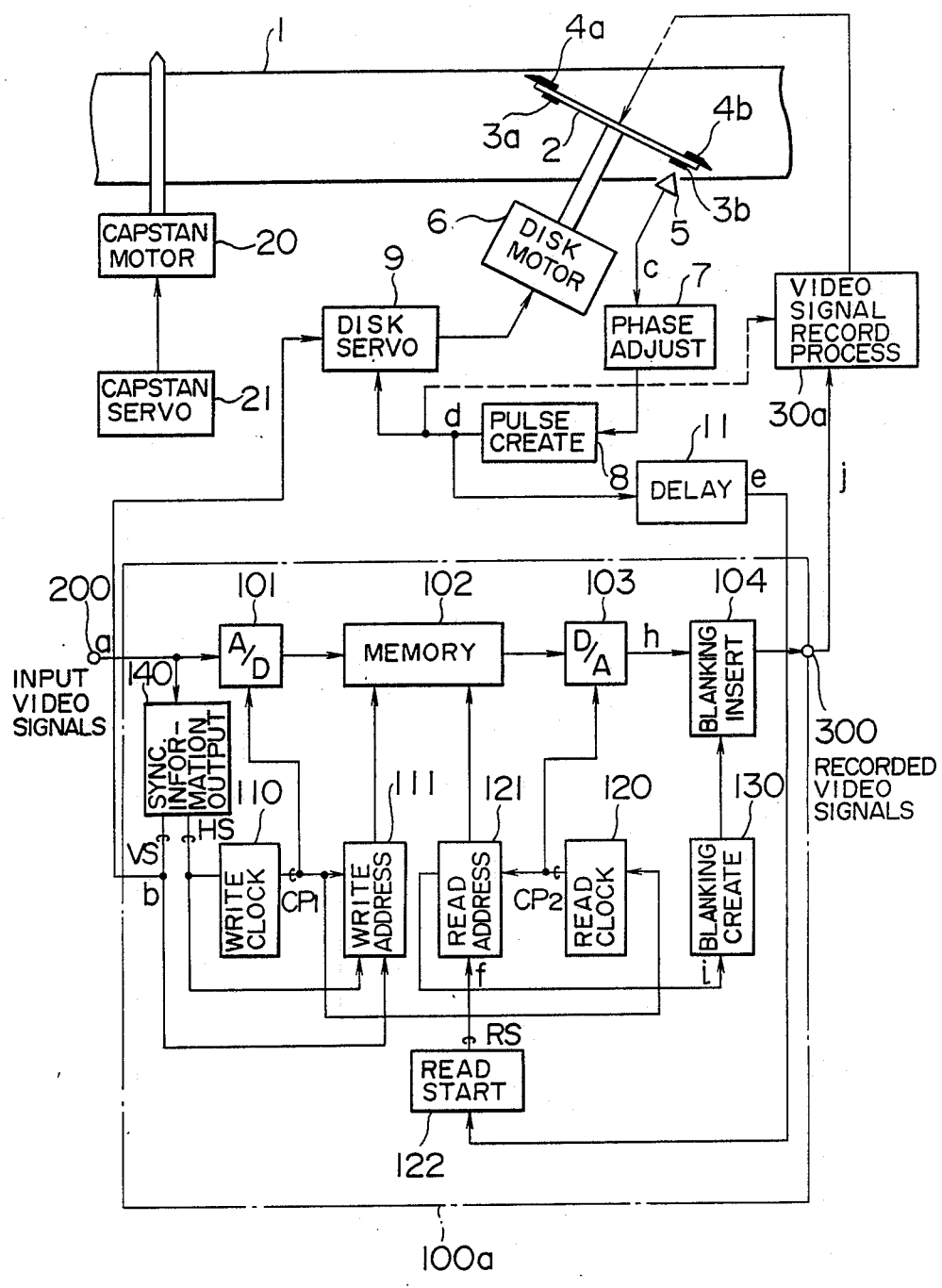
FIG. 1 is a block diagram showing one embodiment of an information signal recording device according to this invention.
Figure 2:
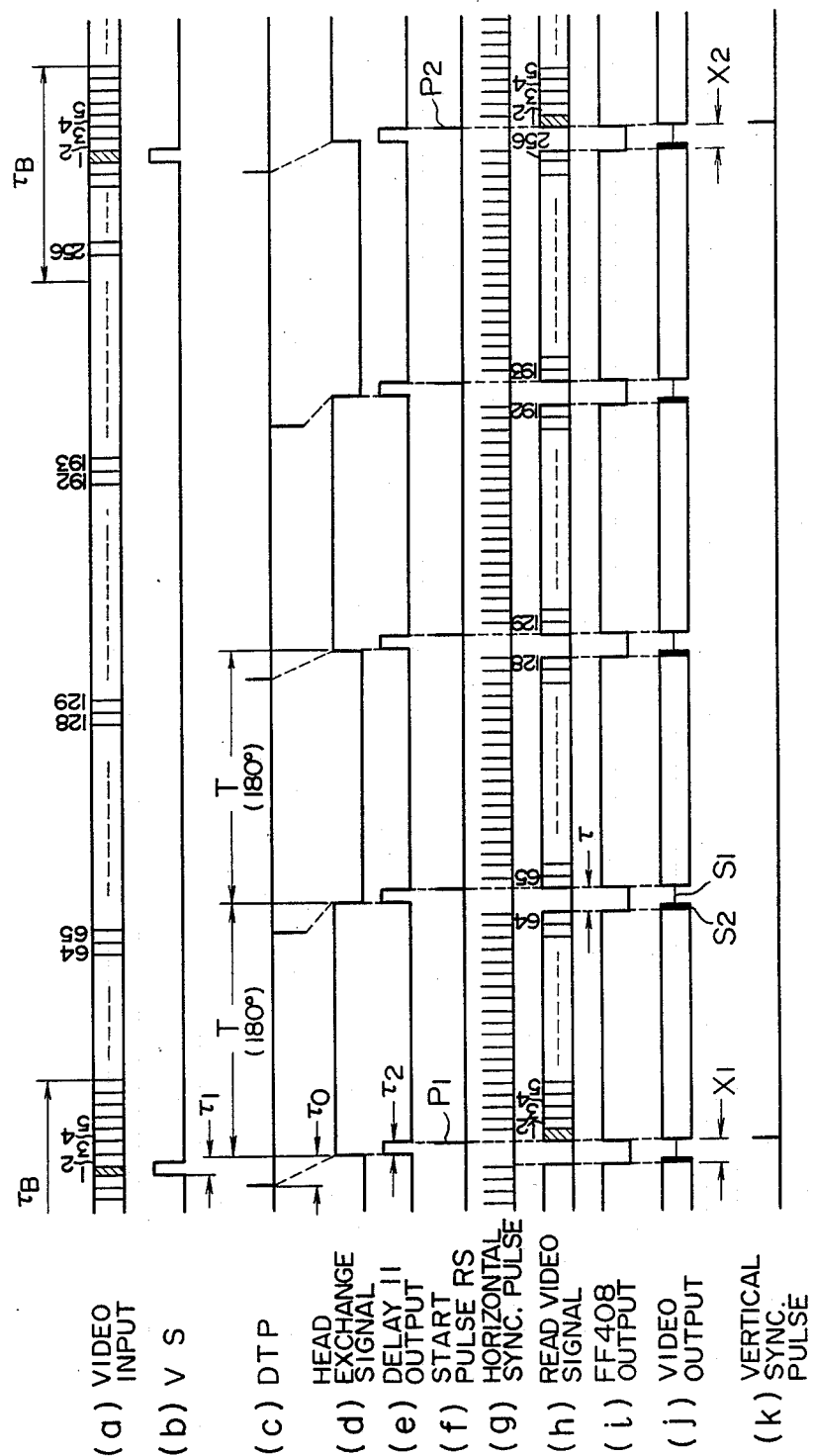
FIG. 2, consisting of (a)–(k), is a waveform chart of the respective parts of the device of FIG. 1.
Figure 3:
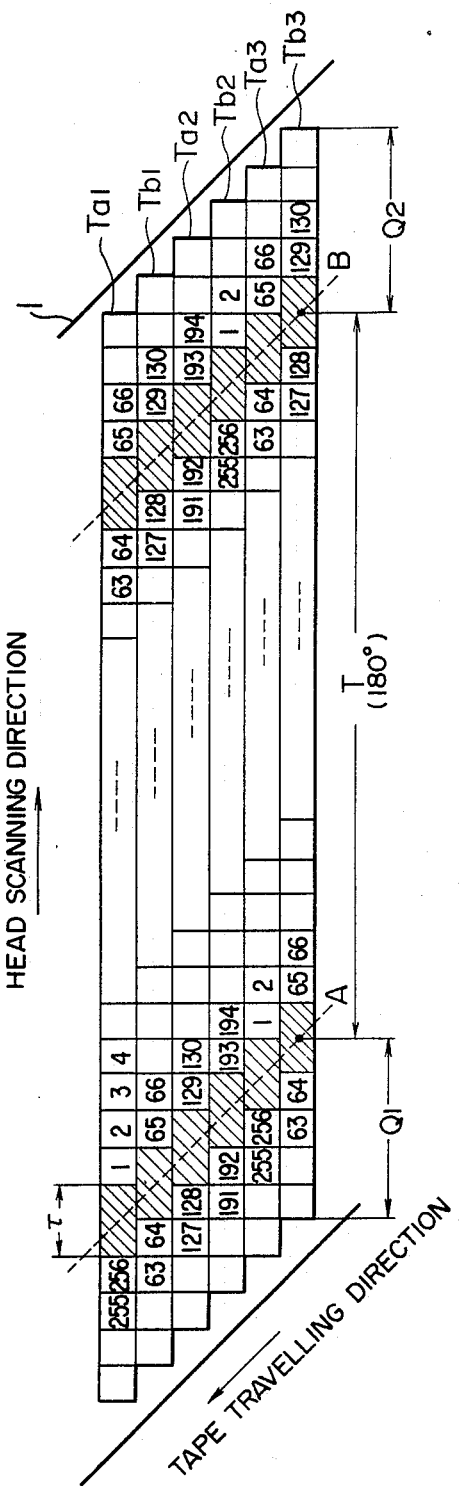
FIG. 3 is a view showing the tape pattern in the device of FIG. 1.

Hereinafter, this invention will be explained in detail in connection with its several embodiments. FIG. 1 shows one embodiment of the video signal recording device where this invention is applied to a two-head type helical scan system VTR in which video signals of an analog format are recorded as information signals. FIG. 2 shows waveforms for explaining the operation of device of FIG. 1. FIG. 3 shows a track pattern of the tape thus obtained.

In FIG. 1, a magnetic tape 1 is moved by a capstan motor 20, the rotation of which is controlled at a constant speed by a capstan servo circuit 21.

Magnetic heads 4a and 4b with different azimuth angles which are attached, with an angle of 180° from each other, on a disk 2 are rotated together with the disk 2. The tape 1 is wound on the disk 2 over 180° so that there is formed portions on the tape 1 simultaneously contacted with the heads 4a and 4b, i.e. so-called overlapped portions on the tracks, represented by $Q_1$ and $Q_2$ in FIG. 3. Two magnets 3a and 3b are attached, with an angle of 180° from each other, on the disk 2. These magnets 3a and 3b are detected by a tach head 5 to provide disk tach pulses DTP ((c) in FIG. 2) in synchronism with the rotation of the heads 4a and 4b. The DTS from the tach, head 5 is phase-adjusted by a phase adjusting circuit 7 so that the heads 4a, 4b and the tape 1 can be in a predetermined position relation, i.e., concretely the DTS's are delayed by a time $\tau_0$ as shown in FIG. 2(c), and thereafter the outputs from the phase adjusting circuit 7 are supplied to a pulse creation circuit 8. This pulse creation circuit 8 outputs pulses having a duty ratio of 50% in synchronism with the rotation of the heads 4a and 4b ((d) in FIG. 2, hereinafter referred to as head exchange signals).

Input video signals ((a) in FIG. 2) are supplied from a terminal 200 to asynchronizing information output circuit 140. This circuit outputs signals VS ((b) in FIG. 2) and signals $H_S$: the signals VS are signals which correspond to the vertical synchronizing signals contained in the input video signals, e.g. signals indicated by shaded portions, contained in the vertical blanking interval $\tau_B$ in FIG. 2(a), and the signals HS are signals which correspond to the horizontal synchronizing information signals included in the input video signals, such as a horizontal synchronizing signals or burst signals. The vertical synchronizing information signals VS from the circuit 140 are supplied to a disk servo circuit 9 as servo reference signals during recording. The disk servo circuit 9 compares the VS's with the head switching signals in their phase and supplies error signals corresponding to the difference therebetween to a disk motor 6. As a result, the disk motor 6 is rotation-controlled so that the VS's and the head exchange signals are phase-locked to each other, more specifically the phase difference time between the VS's ((b) in FIG. 2) and the head switching signals ((d) in FIG. 2) is $\tau_1$ as shown in FIG. 2.

In the case where n-segment recording is carried out, that is, one field of the video signals is divided into n parts which are recorded on the corresponding n tracks, respectively, assuming that the field frequency of the video signals is $f_0$, the number of revolutions of the disk motor 6 in the two head type VTR as shown in FIG. 1 is defined by the disk servo circuit 9 as follows:

$$M = \frac{f_0}{2} \times n \text{ (rps)} \quad (1)$$

The operation of a 4-segment recording in the embodiment as shown in FIG. 1, in which $F_0=60$ Hz, $n=4$ and so $M=120$ rps from Equation (1), will be explained for the case where this invention is applied to existing television systems such as NTSC, PAL, SECAM, etc.

The number x of the horizontal scanning lines of the video signal which can be recorded during the period of 180° in the longitudinal direction of the track, i.e., the period represented by T in FIGS. 2 and 3 can be expressed by the following Equation (2) assuming that the number of the lines for one field is N. That is, $$X = \frac{N}{n} \quad (2)$$

In the case of the existing NTSC system in which the number of the horizontal scanning lines for one field is 262.5 (i.e. 525 for one frame).

$$X = 65.625 \quad (3)$$

When the maximum integer not exceeding X is [X], [X]=65 in the case of Equation (3). In this invention, the number $N_1$ of the lines recorded on one track during the period T of 180° is set to [X] or less.

The embodiment as shown in FIG. 1 relates to the case the number of the lines recorded during the above period T is set as $$[X] \geq N_1 = 64 \quad (4)$$

Incidentally, numerals 1 to 256 included in FIGS. 2 and 3 represent line numbers of the video signals recorded on the tape.

A block 100a indicated by a one-dotted broken lines shows a time base conversion circuit at a recording mode. In the block of FIG. 1, 200 is a video signal input terminal, and 300 is an output terminal of the video signals to be recorded which have been time-base converted by the time base conversion device 100a. 101 is an A/D converter for converting the video signals from the terminal 200 into digital signals; 103 is a memory constituted by a RAM, for example; 104 is a blanking signal insertion circuit; 110 is a write clock creation circuit; 111 is a write address control circuit; 120 is a write clock creation circuit; 121 is a write address control circuit; 122 is a write start pulse creation circuit; and 130 is a blanking signal creation circuit.

The write clock creation circuit 110 creates write clocks $CP_1$ in synchronism with the horizontal synchronizing information signals HS and outputs them. The write clocks $CP_1$ are supplied to the write address control circuit 111 and the A/D conversion circuit 101. The write address control circuit, constituted by a counter, for example, starts to count the write clocks $CP_1$ from the circuit 110 in response to the horizontal synchronizing information signals HS from the circuit 140 and outputs write address signals corresponding to the counting value to the memory 102. The address signals are sequentially renewed for each horizontal scanning period by the horizontal synchronization information signals HS. Thus, the input video signals (a) in FIG. 2) from the terminal 200 are sequentially converted into digital signals by the A/D conversion circuit 101 in synchronism with the write clocks $CP_1$ and the outputs from the circuit 101 are written in the memory 102 for each scanning period in accordance with the addresses from the circuit 111.

For example, if the memory 102 has a storage capacity of 8H (1H is a storage capacity corresponding to one line of the input video signal) and consists of 8 line-unit memories of $M_1, M_2, \ldots M_8$, in the first memory $M_1$, the video signals of line numbers 1, 9, 17, ..., 249 are written, in the second memory $M_2$, the video signals of line numbers 2, 10, 18, ..., 250 are written, and so on. Likewise, in the eighth memory $M_8$, the video signals of line numbers 8, 16, 24, ..., 256 are written. These video signals are cyclically and sequentially written in the time sequence defined above.

In order to assure the write operation in the time sequence defined above, the vertical synchronizing information signals VS from the circuit 140 are supplied to the write address control circuit 111 to assure that, for example, the video signal of the line number 1 for each field is always stored in the memory $M_1$.

The read clock creation circuit 120 creates read clocks $CP_2$ in synchronism with or with a certain ratio to the write clocks $CP_1$ and outputs them; the frequency of the read clocks $CP_2$ may be larger or smaller than or equal to that of the write clocks $CP_1$. The read clocks $CP_2$ from the clock creation circuit 120 are supplied to the read address control circuit 121 and the D/A conversion circuit 103.

A delay circuit 11 is triggered by both the rising edge and falling edge of each output pulse ((d) in FIG. 2) to output a pulse having a predetermined pulse width $\tau_2$ ((e) in FIG. 2). The outputs from the delay circuit 11 are supplied to the read start pulse creation circuit 122 which creates pulses ((f) in FIG. 2) located at the falling edge of each output pulse from the circuit 11. The output pulses from the circuit 122 are in synchronism with the disk tach pulse DTP ((c) in FIG. 2) from the tach head 5 and so with the rotation of said heads 4a and 4b. Thus, the output pulses are supplied to the read address control circuit 121 every scanning period (the period represented by T in FIG. 2) as read start pulses RS for instructing the start of reading the memory 102.

The read address control circuit 121 is constituted by a counter, for example, starts to count the read clocks $CP_2$ from the circuit 120 in response to the read start pulses RS and outputs read address signals corresponding the counting values to the memory 102.

Figure 4:
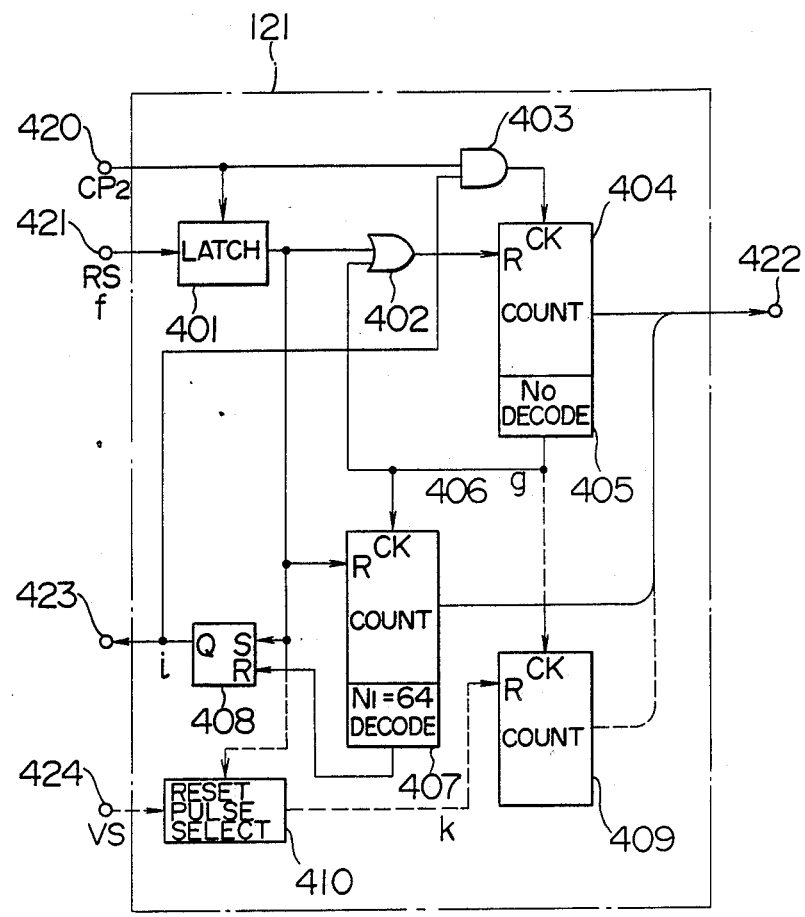
FIG. 4 is a block diagram showing one embodiment of the read address control circuit according to this invention.

One embodiment of the read address control circuit 121 will be explained referring to FIG. 4. In FIG. 4, 420 is an input terminal of the read clocks $CP_2$ from the circuit 120; 421 is an input terminal of the read start pulses RS from the circuit 122; and 422 is an output terminal of the read address signals. The read start pulses RS from terminal 421 are synchronized with the read clocks $CP_2$ from the terminal 420 by a latch circuit 401. The outputs from the circuit 401 are input to the reset input R of a counter 404, thereby resetting the counter 404. The read clocks $CP_2$ from the terminal 420 are supplied to the clock input CK of the counter 404 through an AND gate 403. An R/S flip-flop circuit 408 is set by the latch circuit 401, thereby placing its output Q ([i] in FIG. 2) at a high level "H". Then, the AND gate 403 is opened so that the clocks $CP_2$ from the terminal 420 are supplied to the counter 404, whereby the counter 404 start to count. A decoder 405 which decodes the counting value creates a pulse ((g) in FIG. 2) when the counting value of the counter 404 becomes No. This counting value No in this embodiment is set to be equal to the number of the write clocks $CP_1$ occurring in one horizontal scanning period of the video signals ((a) in FIG. 2). Thus, the outputs from the decoder serve as a horizontal scanning pulse. The output pulses from the decoder 405 are supplied to the reset input R of the counter 404 through the OR gate 402 to reset the counter 404, whereby the counter 404 restarts to count. The above operation is repeated by the output pulses from the decoder 405. The count outputs from the counter 404 are supplied to the memory 102 through the terminal 422 as write address signals. Since the value of No is set to the number of the write clocks occurring in one horizontal scanning period, all the video signals written in the memory 102 are successively read during the horizontal scanning period.

The outputs from the decoder 405 are input to the clock input CK of a counter 406. The outputs from the circuit 401 are input to the reset input R of the counter 406. Thus, the counter 406 is reset to start to count the output pulses. A decoder 407 decodes the counting value of the counter 406 and outputs a pulse when the counting value of the counter 406 becomes $N_1$ which is the number of lines to be recorded on one track (in this embodiment $N_1 = 64$).

The count outputs from the counter 406 are supplied to the memory 102 as read address signals for each horizontal scanning through the terminal 422.

The flip-flop circuit 408 is reset by the output from the decoder 407 and then its output Q ((i) in FIG. 2) becomes a low level "L". Thus, the AND gate 403 is closed and so the counting in the counters 404 and 406 is temporarily stopped.

The above operation is repeated with a period T of the read start pulses from the terminal 421. Therefore, the video signals, which are successively read from the memory 102 by the read address signals from the terminal 422, converted into analog signals by the D/A converted by the D/A converter 103 and thereafter output, are in the form as shown in FIG. 2(h) with respect to a first vertical scanning period. More specifically, during a first scanning period T of the head 4a the video signals are successively output in the order of the line numbers 1, 2, 3, ..., 64; during a first scanning period T of the head 4b, they are successively output in the order of the line numbers 65, 66, ..., 128; during a second scanning period T of the head 4a, they are successively output in the order of the line numbers 129, 130, ..., 192; and finally during a second scanning period T of the head 4b, they are successively output in the order of the line numbers, 193, 194, ..., 256. The above output format entirely applies for the subsequent vertical scanning period. Thus, the same output format is repeated with a field period.

On the other hand, since the value of $N_1$ is decided to satisfy Equation (4), at each change of the scanning of each head, there can be created a redundant period when the video signals are not generated or even if they are generated, they are not required at the reproduction mode.

From the circuit 408 of the read address control circuit 121 shown in FIG. 4, outputs at a low level corresponding to the redundant period $\tau$ are provided as shown in FIG. 2(i). The outputs are supplied to the blanking signal creation circuit 130 shown in FIG. 1 through the terminal 423. In the circuit 130, there are created and output, as required, during the redundant period $\tau$, predetermined blanking signals such as signals (Si of FIG. 2(j)) corresponding to a constant level such as a black level or gray level of the video signals output from the D/A converter circuit 103, or signals in which the above constant level is supplied with any signal such as an index signal indexing the presence of the redundant period. In the blanking signal insertion circuit 104, the blanking signals from the circuit 130 are inserted in the video signals during the redundant period $\tau$ of the video signals output from the D/A converter circuit 103. Thus, the video signals (FIG. 2(j)) output from the circuit 104 are supplied to a video signal recording/processing circuit 30a. The video signals are processed for recording in the circuit 30a. Thereafter the outputs therefrom are supplied to the heads 4a and 4b and successively recorded on the tape 1.

Moreover, although, in the read address control circuit 121 shown in FIG. 4, the count outputs from the counter 406 were also used as the read address signals for each horizontal scanning, this invention is not limited to such an arrangement. As shown by a dotted line in FIG. 4, another counter for counting the output pulses from the decoder 405 may be provided and in place of the count outputs from the counter 406, the count outputs from the counter 409 may be output to the terminal 422 as the above read address signal for each horizontal scanning. In this case, in order to assure the start of read of the memory 102 at a field period, i.e. to start the read from the video signal of the line number 1 stored in the first memory $M_1$ in the memory 102 as mentioned above, a reset pulse selection circuit 410 is provided. This circuit 410, supplied with the vertical synchronizing information signals VS through the terminal 424, selectively separates, on the basis of the information signals VS, the pulses ($P_1$, $P_2$, ... in FIG. 2(f)) included during each vertical blanking period $\neq_B$ of the original video signals from the output pulses from the latch circuit 401 and outputs a vertical synchronizing pulse as shown in FIG. 2(k). The counter 409 is reset by each output pulse (FIG. 2(k) from the circuit 410. According to this arrangement, the number of line memories constituting the memory 102 can be decided, as required, so that the above sequential operation of write and read can be assured for all the lines without excess and lack.

The pattern of the tracks on the tape 1 obtained by the above mentioned recording method according to this invention is shown in FIG. 3. In FIG. 3, $T_{a1}$, $T_{a2}$, $T_{a3}$, ... indicate the tracks recorded by the scanning by the head 4a while $T_{b1}$, $T_{b2}$, $T_{b3}$, ... indicate the tracks recorded by the scanning by the head 4b. Broken lines A and B indicate the positions on the tape 1 corresponding to the phases of the rising edge and falling edge of the head exchange signal (FIG. 2(d)) output from the pulse creation circuit 8. The period $\tau$ at shaded portions corresponds to the aforementioned redundant period $\tau$. Additive numbers 1 to 256 on each track indicate line numbers of the recorded video signals.

As apparent from the above explanation, the number of lines of the video signals output from the time base converter device 100a and recorded is not enough. Namely, although the video signals of 256 lines from line numbers 1 to 256 are recorded for each field, 6.5 lines are still needed for the number of lines, 262.5 for the field, included in the input original video signals from the terminal. In this invention, the shortage of the number of lines of the recorded video signals, provided by the above recording method is compensated for during each vertical blanking period $\tau_B$ included in the original video signals. More specifically, the rotating phases of the heads 4a and 4b are controlled so that the positions (positions shown by $x_1$, $x_2$, ... in FIG. 2(j)) where the lines are lacking are located within the vertical blanking period $\tau_B$ of the original video signals (FIG. 2(a)). Therefore, even if the lack of the number of lines occurs, the lacked lines are within the vertical blanking period of the original video signals. Thus, this does not lead to the lack of the video information signals to be displayed on the reproduced image.

Figure 6:
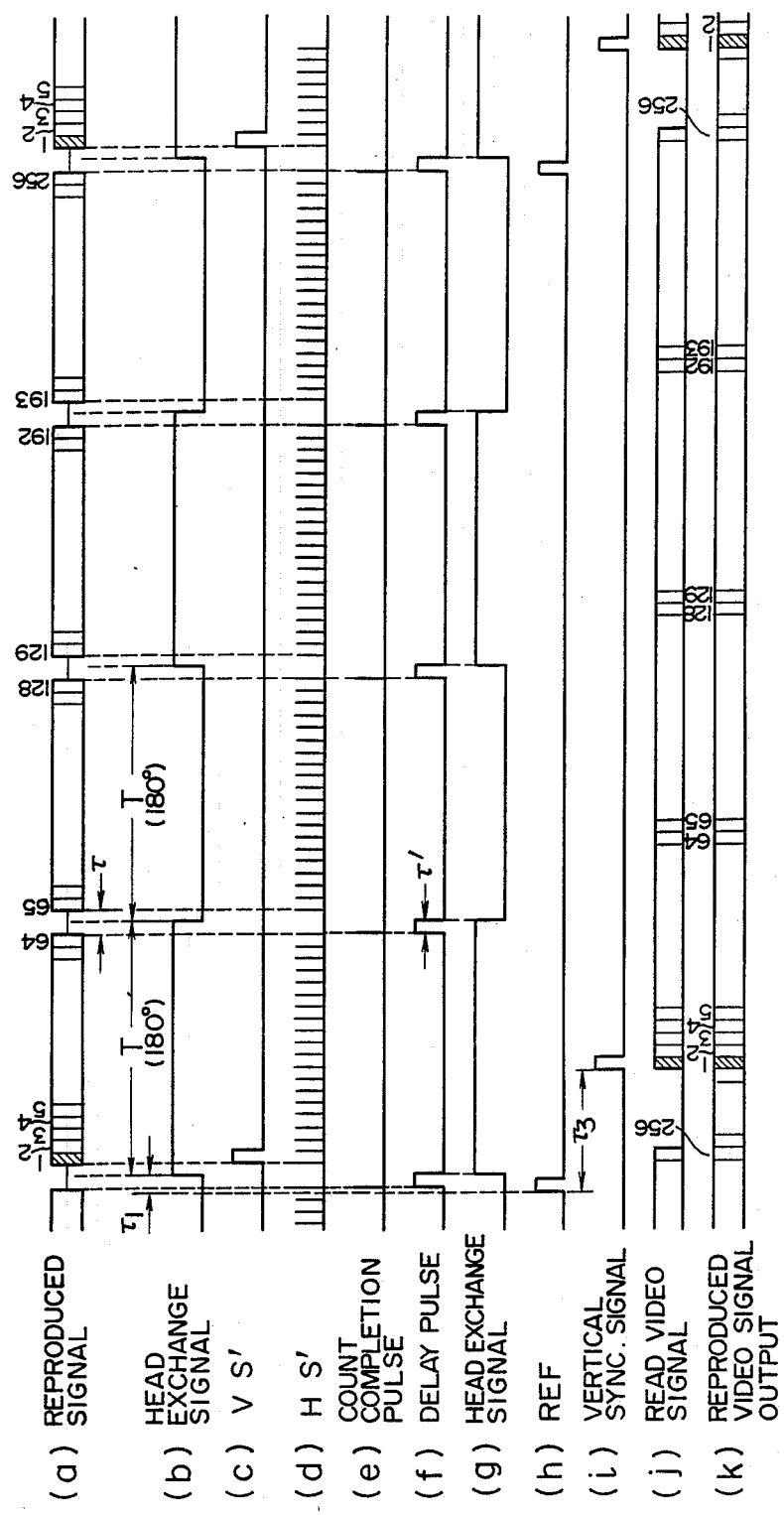
FIG. 6 consisting of (a)–(k), is a waveform chart of the respective parts of the device of FIG. 5.

There is shown in FIG. 5 one embodiment of the reproduction device according to this invention for reproducing the video signals thus recorded and restoring the original video signals, and shown in FIG. 6 is a waveform chart of the respective parts of the device for explaining the operation thereof. The device shown in FIG. 5 can have a part common to a part of the recording device of FIG. 1. The common parts are numbered with the same numbers. The operation of the common parts have been explained and so the explanation will be omitted.

In FIG. 5, the video signals alternately reproduced from the tape 1 by the heads 4a and 4b are processed for reproduction as required in a video signal reproduction/processing circuit 30b and thereafter the output therefrom (FIG. 6(a)) are supplied to the time base converter device 100b. In a synchronizing information output circuit 140', vertical synchronizing signals VS' (FIG. 6(c)) and horizontal synchronizing signals HS' (FIG. 6(d)) are separated from the reproduced video signals from the circuit 30b and output. In a write clock creation circuit 110', the write clocks $CP_2'$ in synchronism with the horizontal synchronizing information signals HS' are created and output.

The write clocks $CP_2'$ are created in such a manner that they are instantaneously phase-locked with the horizontal synchronization information signals such as the horizontal synchronizing signals, burst signals, etc. included in the reproduced video signals so as to be continuous in one horizontal scanning period of the video signals. Also, the write clocks $CP_2'$ are created to have the same frequency ($f_2$) as that of the read clocks $CP_2$ shown in FIG. 1. In the A/D converter circuit 101, the reproduced video signals from the circuit 30b are successively converted into digital signals in accordance with the write clocks $CP_2'$ from the circuit 110'. A write address control circuit 111', constituted by a counter, etc., starts to count the write clocks $CP_2'$ in accordance with the horizontal synchronizing information signals HS' from the circuit 140' and outputs the address signals corresponding to the counted values to supply them to memory 102 as write address signals. The write address signals are successively renewed in accordance with the horizontal synchronizing information signals HS' for each scanning period. Thus, the outputs from the circuit 101 are successively and cyclically written in the memory 102 for each horizontal scanning.

Now, it should be noted that, as mentioned in connection with FIG. 1, the video signal are recorded so that the redundant periods $\tau$ are placed at the changing points of the scanning by the heads 4a and 4b, i.e. the positions of the shaded portions A and B in FIG. 3 which correspond to the phases of the rising edge and falling edge of each of the head exchange signals (FIG. 6(b)) from the circuit 8, so that the locations of the redundant periods τ can be detected from the head exchange signals. Thus, in the circuit 30b, the video signals reproduced by the heads 4a and 4b can be alternately exchanged in the redundant periods τ by the head exchange signals from the circuit 8 so that all the video signals included during the scanning periods of the heads 4a and 4b can be surely reproduced. Namely, during the first scanning period T of the head 4a, the video signals are reproduced in the order of line numbers 1, 2, 3, ..., 64; during the first scanning period T of the head 4b, they are reproduced in the order of line numbers 65, 66, ..., 128; during the second scanning period T of the head 4a they are reproduced in the order of the line numbers 129, 130, ..., 192; and during the second scanning period T of the head 4b, they are reproduced in the order of the line numbers 193, 194, ..., 256. The above operation is repeated with a field period, and thus all the video signals (FIG. 6(a)) are output from the circuit 30b.

On the other hand, in the circuit 111' a predetermined number (64 in this embodiment) of the horizontal synchronizing information signals from the circuit 140' are counted for each scanning period T of the heads 4a and 4b, and during the period from the completion of this counting to the input of the subsequent horizontal scanning signal HS', i.e. the period corresponding to the redundant period τ, the output of the write address signals are temporarily stopped. Thus, the video signals are not written in the memory 102 during the periods τ, and any blank portions in which is video signal is not written are not provided in the memory 102 due to the period τ. Accordingly, all the outputs (line numbers 1 to 256) from the circuit 101 are cyclically and successively written in the memory 102 for each horizontal scanning.

Moreover, in the circuit 111', the horizontal synchronizing information signals HS' may be counted in such a manner that the counting thereof is started for each rising edge and for falling edge of the head exchange signals supplied from the circuit 8 as shown by a broken line path in FIG. 5 and a predetermined number (64) of the horizontal synchronizing information signals thereafter input is counted. However, the horizontal synchronizing information signals may be counted using the vertical synchronizing information signal VS' (FIG. 6(c)) from the circuit 140' in place of the head exchange signals in such a manner that the counting thereof is started in accordance with the vertical synchronizing information signals, and thereafter the counting for each predetermined number (64) thereof is successively repeated.

The latter counting method permits the locations of the redundant periods τ to be self-detected on the basis of the vertical synchronizing information signal VS' without using the head exchange signals. Further, when the predetermined number of the horizontal synchronizing information signals HS' are counted through this method, count completion pulses (FIG. 6(e)) are provided from the circuit 111' In the delay circuit 141, the count completion pulses are delayed by a predetermined time τ' (=τ/2) to provide delayed pulses (FIG. 6(f)). In the latch circuit 142, the head exchange signals from the circuit 8 are synchronized with the falling edges of the outputs (FIG. 6(f)) from the delay circuit 141. Thus, from the circuit 142 are provided signals with their rising edge and falling edge included in the redundant period τ, as shown in FIG. 6(g). Accordingly, the outputs from the circuit 142, in place of the head exchange signals, may be supplied to the circuit 130 as shown by the broken line path in FIG. 5 to alternately exchange the outputs from the heads 4a and 4b. In this case also, all the video signals can be successively reproduced without shortage or excess of the lines.

A read clock creation circuit 120', having a crystal oscillator, creates clocks $CP_1$ having the same frequency ($f_1$) as that of the write clocks $CP_1$ shown in FIG. 1 and outputs them. A reference signal creation circuit 131 properly divides the clocks from the circuit 120' to create and output blanking signals BLK (including synchronizing information) having the same format and frequency as those of the original video signals (FIG. 2(a)), horizontal synchronizing information signals H, vertical synchronizing information signals V (FIG. 6(i)) and reference signals REF (FIG. 6(h)) having the timings advanced by a predetermined time $\tau_3$ from the vertical synchronizing information signals V. A read address control circuit 121', constituted by a counter, etc., starts to count the read clocks $CP'_1$ from the circuit 120' in accordance with the horizontal synchronizing information signals and supplies the address signals corresponding to the count values to the memory 102 as read address signals. The read address signals are successively renewed in accordance with the horizontal synchronizing information signals H for each horizontal scanning period, and when a predetermined number (256 in this embodiment) of the horizontal synchronizing information signals have been counted, the output of the read address signals is temporarily stopped. The above series of counting operations are resumed in accordance with the vertical synchronizing information signals V and thereafter the operation as mentioned above is repeated.

Therefore, the video signals are successively read out from the memory 102 in accordance with the read address signals from the circuit 121', converted to analog signals in the D/A converter circuit 103 and thereafter outputted. Thus, all of the video signals, i.e., those of line numbers 1 to 256 for each field are successively provided, as shown an FIG. 6(j). In the blanking signal insertion circuit 105, the blanking signals BLK are inserted in the outputs (FIG. 6(j)) from the D/A conversion circuit 103 to output reproduced video signals (FIG. 6(k)) to a terminal 400.

The reference signals REF from the circuit 131 are supplied to the disk servo circuit 9 as servo reference signals at a reproduction mode. This circuit 9 performs entirely the same servo control as mentioned in connection with FIG. 1. Namely, the disk motor 6 is rotation-controlled so that the reference signals (FIG. 6(h)) REF and the head exchange signals (FIG. 6(b)) from the circuit 8 are phase-locked with each other, more concretely the phase difference time therebetween is $\tau_1$.

The above servo control is performed so that the write operation for the memory 102 precedes the read operation therefor. Therefore, all the video signals written in the memory 102 are properly read in a stabilized time base free from any variation. In the circuit 105, the blanking signals and synchronizing information signals cancelled at a recording mode are compensated for the above blanking signal BLK in a stabilized time base as in the reading thereof.

The capstan motor 20 is rotation-controlled by the capstan servo circuit 21', which includes a tracking control circuit for controlling the relative phases of the tape 1 and the heads 4a and 4b therebetween to properly reproduce the video signals.

The operation of this tracking control circuit according to this invention will be explained below.

Figure 7:
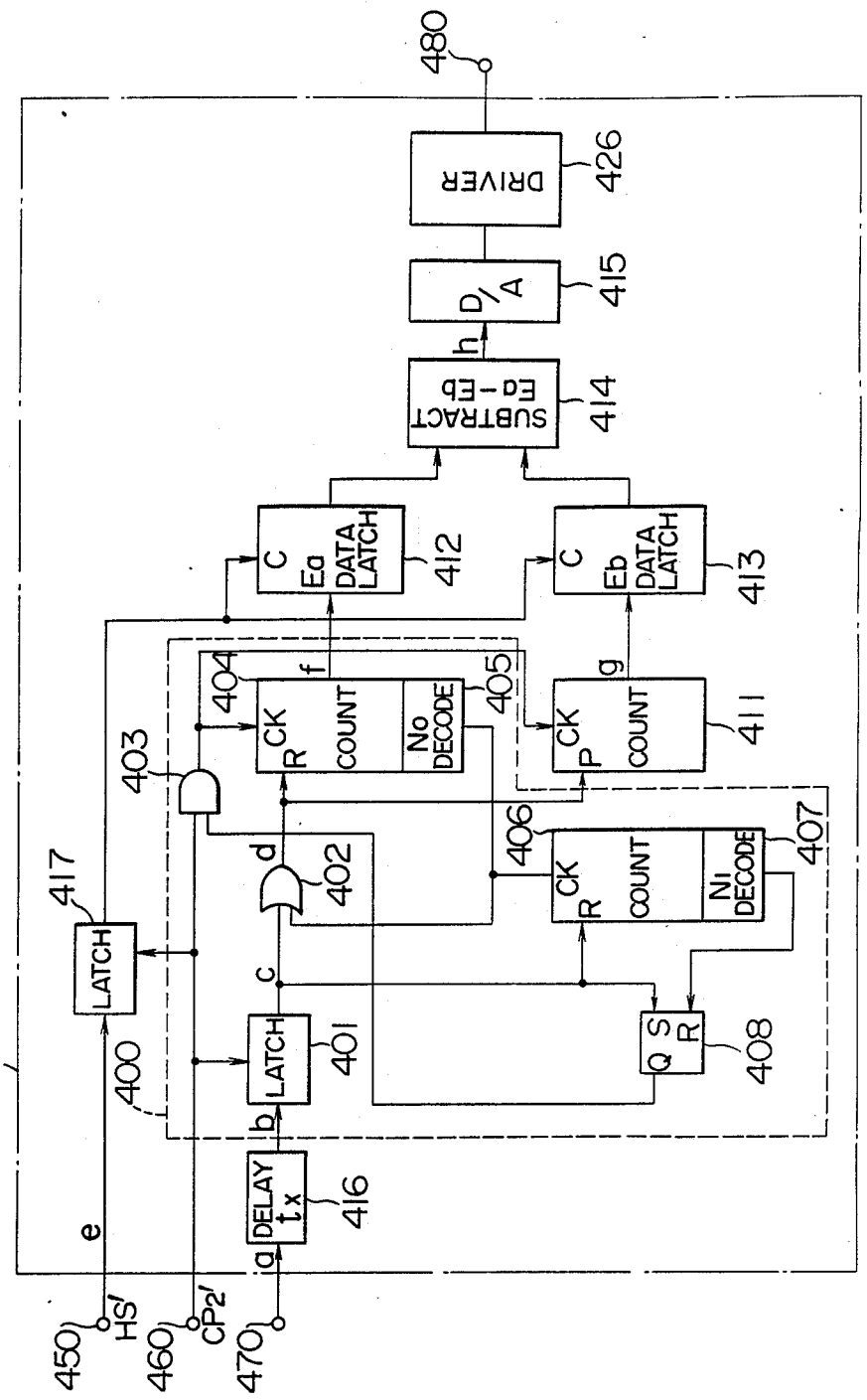
FIG. 7 is a block diagram of one embodiment of the tracking control circuit according to this invention.
Figure 8:
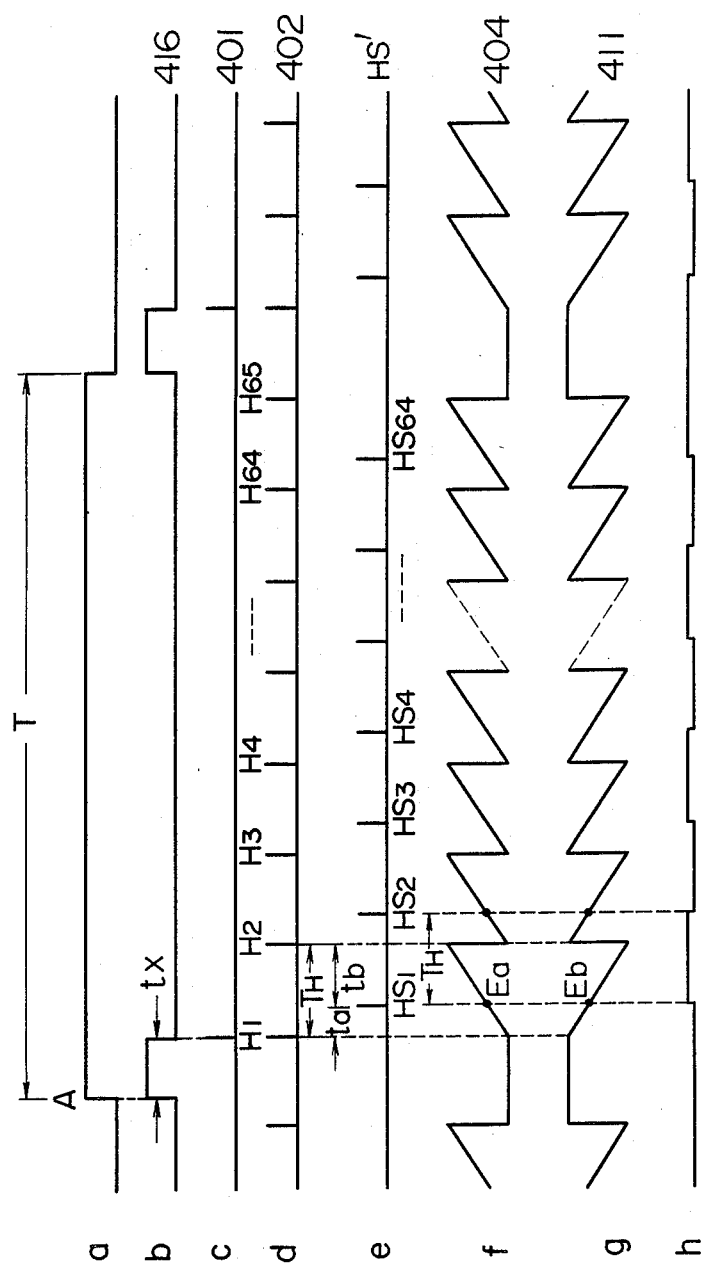
FIG. 8 consisting of a–h, is a waveform chart of the respective parts of the circuit of FIG. 7.
Figure 9:
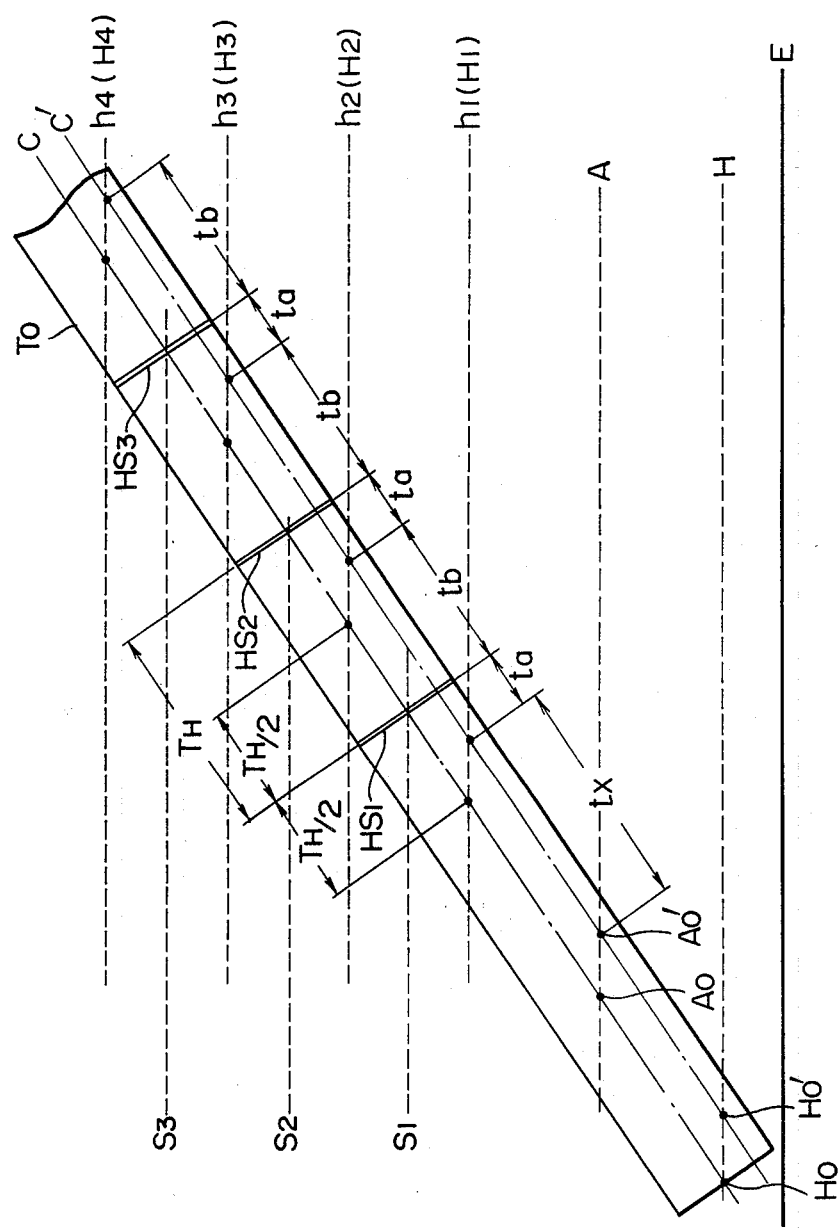
FIG. 9 is a partially enlarged view of a track.

FIG. 7 is a block diagram showing one embodiment of the tracking control circuit according to this invention, FIG. 8 is a waveform chart of the respective parts of the circuit of FIG. 7 and FIG. 9 is an enlarged view of a part of the tracks recorded in accordance with this invention.

A circuit block 400 encircled by a broken line in the tracking control circuit shown in FIG. 7 is entirely the same as the read address control circuit shown in FIG. 4 in their arrangement and operation so that detailed explanation therefor will be omitted. The elements in the block 400 corresponding to those in FIG. 4 are numbered with the same numbers as in FIG. 4.

In FIG. 7, 450 is an input terminal of the horizontal synchronizing information signal HS' from the synchronizing information output circuit 140' shown in FIG. 5. 460 is an input terminal of the clocks having the same frequency ($f_2$) as that of the read clocks $CP_2$ shown in FIG. 1. Although the clocks may be created separately by a quartz oscillator, etc. in this embodiment, the write clocks $CP_2'$ from the write clock creation circuit 110' in FIG. 5 are input to a terminal 460. 470 is an input terminal of the head exchange signals from the pulse creation circuit 8 in FIG. 5.

480 is an output terminal of tracking error signals which are supplied to the capstan motor 20 in FIG. 5 through a capstan motor driver circuit (not shown) to perform a tracking control.

A delay circuit 416 is triggered by both the rising edge and falling edge of each of head exchange signal (FIG. 8(a)) from the terminal so as to output pulses delayed by the time $t_x$ (FIG. 8(b)). In the latch circuit 401, the output pulses from the circuit 416 are synchronized with the clocks $CP_2'$ from the terminal 460 so as to output start pulses (FIG. 8(c)) with the timings of the falling edges thereof.

The counter 406 is reset by each of the start pulses from the circuit 401, and the counter 404 is also reset thereby through the OR gate 402. At the same time, the R/S flip-flop 408 is set thereby to open the AND gate. As a result, the clocks $CP_2'$ are supplied to the counter 404 so that the counter 404 starts to count.

The count values in the counter 404 are decoded by the decoder 405. The counter 404 is reset again by each of the pulses output when the count value is $N_0$ so that the above series of operations are repeated. The output pulses from the decoder 405 are counted by the counter 406, and the count values are decoded by the decoder 407. The R/S flip-flop 408 is reset by each of the pulses output when the count value is $N_1$, thereby closing the AND gate 403. Thus, the above series of the count operations are temporarily stopped.

The value of $N_0$ is defined so that it is equal to the value obtained by dividing the horizontal scanning period $T_H$ of the video signals by the period of the clocks $CP_2'$. The value of $N_1$ is defined to the value not exceeding the number of the lines recorded on one track, as indicated by Equation (4). In this embodiment, $N_2=64$.

Thus, from the OR gate 402, 65 pulses consisting of $H_1, H_2, H_3, \ldots, H_{65}$, as shown by FIG. 8(d), having a period of the scanning period T of the heads and pulse intervals equal to the horizontal scanning periods $T_H$ are output. These pulses from the OR gate 402 are hereinafter referred to as reference pulses.

On the other hand, the horizontal scanning information signals HS' for the reproduced video signals, $HS_1, HS_2, HS_3, \ldots, HS_{64}$ having pulse intervals equal to the horizontal scanning periods $T_H$ as shown by FIG. 8(e) since 64 lines are reproduced during the scanning period of the heads.

The counter 404 is reset by each of the reference pulses from the OR gate 402 to serve as an up-counter which repeats the up-count of the count values from 0 to $N_0$. The manner of the count operation by this counter 404 is shown by FIG. 8(f) with the ordinate representative of the count values. On the other hand, a counter 411, which is a presettable down-counter, is preset to the count value $N_0$ by each of the reference pulses supplied to its preset terminal P from the OR gate 402. And this counter 411 counts the clocks from the AND gate 403 so as to repeat the down-count of the count values from $N_0$ to 0. The manner of the count operation by this counter is shown by FIG. 8(g).

The horizontal synchronizing information signal HS' from the terminal 450 are synchronized with the clock $CP_2'$ in a latch circuit 417, and the outputs therefrom are supplied to the clock inputs C of data latch circuits 412 and 413.

In the data latch circuit 412, the count data from the counter 404 are latched and held in accordance with the outputs from the circuit 417. The latched count data $E_a$ is, as apparent from FIGS. 8(d) and 8(e), a value proportional to the time $\tau$ of each of the phase differences between pulses $H_1$ and $HS_1$, pulses $H_2$ and $HS_2$, ..., pulses $H_{64}$ and $HS_{64}$.

Similarly, in the data latch circuit 413, the count data from the counter 411 are latched and held in accordance with the output from the circuit 417. The latched count data is, as apparent from FIGS. 8(a) and 8(b), a value proportional to the time $\tau$ of each of the phase differences between pulses $HS_1$ and $H_2$, pulses $HS_2$ and $H_3$, ..., pulses $HS_{64}$ and $H_{65}$.

The outputs from the data latch circuits 412 and 413 are supplied to a subtraction circuit 414 to perform a differential operation between the data $E_a$ and $E_b$. The data ($E_a-E_b$) output from the circuit 414 are converted into analog signals in a D/A converter circuit 415. The outputs from the D/A converter circuit 415 are amplified in a driver circuit 426 and output to the terminal as tracking error signals (FIG. 8(h)).

The tracking error signal is proportional to the data ($E_a-E_b$) and thus the difference ($t_a-t_b$) between the phase errors $t_a$ and $t_b$.

The tracking error signals are negative-feedback controlled in such a manner that they are negative-fed back to the capstan motor 20 shown in FIG. 5 so that the tracking error signals are 0, that is, the data $E_a$ and $E_b$ are equal and thus the phase errors $t_a$ and $t_b$ are equal, i.e., $$t_a = t_b = T_H/2 \tag{5}$$

The relations between the aforementioned control operation and the tracking states will be explained with reference to FIG. 9 which is an enlarged view of a part of the track shown in FIG. 3, for explaining the principle of tracking control.

In FIG. 9, C is the scanning center line of a track $T_0$, $H_0$ is a scanning starting point of the heads, $A_0$ is a point on the track $T_0$ corresponding to the phases of the rising edge and falling edge of the head exchange signal and $HS_1, HS_2, HS_3, \ldots, HS_{64}$ are recording points on the track $T_0$ of the horizontal synchronizing information signals HS'.

The horizontal synchronizing information signals $HS_1$, $HS_2$, $HS_3$, ..., $HS_{64}$ are recorded on each track by the recording device of FIG. 1 so that they are precisely located on the lines $S_1$, $S_2$, $S_3$, ..., $S_{64}$ which are parallel to the edge line E of tape 1 and apart therefrom by a predetermined distance.

The scanning starting point of the head is always located on the line H apart from the tape edge line E by a predetermined distance.

The phase of the head exchange signal is also always located on the line A apart from the tape edge line E by a predetermined distance. Therefore, the phases of the reference pulses $H_1$, $H_2$, $H_3$, ..., $H_{65}$ from the OR gate 402 shown in FIG. 7 which are phase-locked with the head exchange signals are also located on the lines $h_1$, $h_2$, $h_3$, ..., $h_{65}$ apart from the tape edge line E by predetermined distances, respectively. The above A and $h_1$ are in a phase relation apart from each other by the time $t_x$ on the tape 1 by the delay circuit 416.

Now, if the track $T_0$ is scanned with a scanning line C' because of the tracking error generated when it is scanned for reproduction, the scanning starting point is located at the point $H_0$ on the line H and the phase of the head exchange signal is located at the point $A_0'$ on the line A. As a result, the phase relation between the reproduced horizontal synchronizing information signals and the reference pulses is as follow. With respect to the $HS_1$ first reproduced, the phase difference time between the pulse $H_1$ and $HS_1$ is detected as $t_a(<T_H/2)$ while the phase difference time between the pulse $H_2$ and $HS_1$ is detected as $t_b(>T_H/2)$. Similarly, as to the horizontal synchronizing information signals $HS_2$ subsequently reproduced, the phase difference time between the pulse $H_2$ and $HS_2$ is detected as $t_a$ while the phase difference time between the pulse $H_3$ and $HS_2$ is detected as $t_b$. Likewise, the phase error information consisting of 64 samples equal to the synchronizing information signals per one track is detected.

Thus, it can be easily understood that the direction and magnitude of the deviation of the line C' from the normal scanning center line C can be detected from the magnitude relation between $t_a$ and $t_b$.

Since the tracking control is carried out so that the phase errors $t_a$ and $t_b$ satisfy Equation (5) as already mentioned in connection with FIG. 7, the track $T_0$ is properly scanned on its normal scanning line C by the head.

As understood from the above explanation, in accordance with this invention, the information signal including synchronizing information is time-base processed so as to precisely synchronize with the rotation of the heads without any variation. Even if the rotation speed and rotation phase vary at a recording mode, the synchronizing information is recorded at fixed positions without any variation through the time buffering effect by the time base converter device 100a. At a reproduction mode, the reference pulses are created precisely in synchronism with the rotation of the head without any variation. Therefore, the tracking error information detected on the basis of the phase difference between the synchronizing information signals reproduced and the reference pulses contains only the real tracking error but does not contain any other variation error, which permits the tracking control to be performed in a very stabilized manner with a large S/N. The tracking error information can be minutely detected in a longitudinal direction of the track in accordance with the number of the synchronizing information signals recorded so that the sampling rate thereof can be sufficiently enhanced. Thus, the tracking control can be implemented at high accuracy, minuteness and adaptability.

In the above embodiment shown in FIG. 7, the reference pulses were created in a feedforward format by the head exchange signals. However, they may be created in a feedback format by the head exchange signals using a so-called PLL (phase-locked loop) circuit, as in another embodiment, which will be explained below with reference to FIG. 10.

In FIG. 10, 310 is an input terminal of the head exchange signals and 320 is an output of the reference pulses. The head exchange signals from the terminal 310 are supplied to one input of a phase comparator circuit 301. To the other input of the phase comparator circuit 301 are supplied the outputs obtained by dividing, as required, the outputs from a voltage control oscillator circuit 303 into 1/m (m: positive integer) in a divider circuit 304. In the phase comparator circuit 301, the head exchange signals and the outputs from the circuit 304 are compared in their phase. The phase error signals in accordance with the phase difference therebetween are output from the circuit 301. The outputs from the circuit 301 are supplied to the voltage control oscillator circuit 303 as the control voltages therefor through a phase compensation circuit 302.

Thus, a PLL circuit is constituted so that the oscillation outputs with a period $T_H$ phase-locked with the head exchange signals are provided from the circuit 303.

A timing regulating circuit 305 delays the outputs from the circuit 303 by the time $t_x$ on the basis of the head exchange signals from the terminal 310 for each period thereof T so as to create the reference pulses having the same timings as in FIG. 8(d) and output them to the terminal 320.

The reference pulses from the terminal 320 are compared with the synchronizing information signals in their phase in the same manner as in FIG. 7 although not shown. As a result, the signals corresponding to the phase differences therebetween are detected as tracking error signals, which are negative-fed back to the capstan motor 20 shown in FIG. 5 through the capstan motor driver circuit 426 to perform the tracking control.

As explained above, in accordance with this invention, the tracking error signals can be minutely detected in the longitudinal direction of the track. Therefore, in place of the tracking control by the capstan servo system as shown in FIG. 5, another tracking control method may be adopted in such a manner that the track is properly scanned by the heads by perturbing a movable member, such as a piezo-electric element, on which the magnetic heads 4a and 4b are provided, using the tracking error signals; the movable member being perturbable in both the scanning direction of the heads and the direction perpendicular thereto. This method permits the tracking control to be performed with higher accuracy and so minutely as to follow track curves.

The perturbation system of the magnetic heads in this tracking control will be explained referring to FIGS. 11 and 12.

In FIG. 11, the magnetic heads 4a and 4b are fixed to free ends of bimorph plates 52 of movable plate elements of piezo-electric ceramic material, which are cantilevers fixed, in their one ends, to metallic attachments 59 attached to a rotating upper cylinder 53; the above free ends are located at the outer periphery of the rotating upper cylinder 53. The rotating upper cylinder 53 is fixed to a rotating shaft 55 through a rotating disk 54 so that the rotating shaft 55, rotating disk 54, rotating upper cylinder 53 and rotating magnetic heads 4a, 4b rotate integrally. A slip ring 56 is attached to the rotating upper cylinder 53, and electrodes 58a of the bimorph plate 52 are connected with the slip ring 56 through wirings 58b. The slip ring 56 is supplied with a voltage from a brush 57 at a stationary side. 1 is a magnetic tape.

FIG. 12 shows the operation theory of the bimorph plate 52. The bimorph plate 52 wholly bends by applying the voltage between the attachment 59 and the electrode 58a to cause its free end to be displaced in the same direction as the rotating shaft 55. Therefore, if the voltages in accordance with the tracking error signals are applied from the exterior through the brush 57, the rotating heads 4a and 4b can be displaced by a desired amount in the direction parallel to that of the rotating shaft 55, thereby performing the tracking control.

In the embodiment shown in FIG. 7, the tracking control was performed so that the phase errors $t_a$ and $t_b$ are equal to each other. However, this invention is not limited to such a tracking control. As apparent from Equation (5), the tracking control may be also performed so that either one of the phase errors $t_a$ and $t_b$ is constant, e.g. a fixed value $T_H/2$ in this embodiment. According to the latter case, the size of the tracking control circuit can be reduced.

As understood from the explanation for FIG. 7, since the tracking state can be varied by varying the delay time $t_x$ in the delay circuit 416, the adjustment thereof enables the tracking points to be adjusted.

Further, in the above embodiment, the tracking error signals were detected for each period $T_H$ of the synchronizing information signals. However, the detection rate may be reduced so that the detection is made for each $k \times T_H$ (k is a positive integer); this can be implemented by inserting, between the input terminal 450 and the latch circuit 417 in FIG. 7, a frequency divider which frequency-divides the horizontal synchronizing pulses HS' into 1/k. For example, assuming that k = 64, the tracking control may be performed by only one detection of the tracking error signals for each track.

The aforementioned embodiments relate to the cases where this invention is applied to the devices for recording and reproducing analog information signals. However, this invention can also be applied to the devices for recording and reproducing digital information signals, such as a digital VTR, digital audio tape recorder, digital data recorder, etc. In the case where the digital information signals are recorded, although not shown, there has been known a method for recording synchronization information in such a manner that each of so-called synchronization codes is added to each block consisting of a predetermined number of bits of recorded data. In accordance with this invention, entirely similarly to the above embodiments, the tracking control can be performed so that the tracks are properly scanned also by using the above synchronization codes as the synchronization information, more specifically by detecting the tracking error signals in accordance with the phase differences between the synchronization codes reproduced and detected and the reference pulses created in synchronism with the head exchange signals to control them so that the phase difference times are constant.

Accordingly, in accordance with this invention, the synchronizing information such as synchronizing signals, synchronizing codes, etc. included in the information signals such as analog signals, digital signals, etc. can be also as tracking control signals, so that the signals dedicated to the tracking control such as control signals, pilot signals, etc. which have been generally employed for the tracking control are not required. Therefore, the recording density can be correspondingly enhanced. Further, such conventional problems as S/N attenuation, etc., which results from that the tracking control signals such as the pilot signals obstruct the information signals, can be solved, thereby providing a device which is capable of recording and reproducing information signals with high accuracy and S/N.

In the embodiments as shown in FIGS. 1 and 5, the video signals were recorded in existing television systems such as NTSC, PAL, SECAM, etc. However, this invention can also be applied to the television system in which the number of scanning lines is different from that in the existing television systems, for example, a high definition television system having 1125 horizontal scanning lines. Further, the synchronizing information for video signals was, as in the prior art, the horizontal synchronizing information for each horizontal scanning (horizontal synchronizing signals and burst signals) and the vertical synchronizing information for each vertical scanning (vertical synchronizing signals). However, this can also be applied to the case where in place of the ordinary synchronizing signals, the synchronizing information partially superposed during the horizontal blanking $T_B$ (horizontal synchronizing signals HX with a positive polarity and vertical synchronizing signals BX with a negative polarity) are used as shown in FIG. 13(a); the case where also as shown in FIG. 13(a), the luminance information Y and chromaticity information C are time-division-multiplexed with a pair of horizontal synchronizing information (horizontal synchronizing signal HS and burst signal BX) allotted to one horizontal scanning period $T_H$; the case where as shown in FIG. 13(b), a pair of horizontal information (HX and BX) are allotted to a plurality (e.g. two) of horizontal scanning; the case where as shown in FIG. 13(c), as the horizontal synchronizing information, the horizontal synchronizing signal HX is not allotted but only the burst signal BX is allotted; the case where although not shown, the vertical synchronizing information is not allotted to each field period but to e.g. each frame period; and the case where only the vertical blanking interval is included and the vertical synchronizing information is not partically allotted. In all the cases mentioned above, the tracking control can be performed using the synchronizing information included in the video signals.

Further, in the embodiment shown in FIG. 1, by setting the frequency ($f_1$) of the write clock $CP_1$ and the frequency ($f_2$) of the read clocks $CP_2$ so that $f_1 < f_2$, the recorded video signals time-base converted from the original video signals in the circuit 100a have the horizontal scanning period $T_H'$ which in a relation $T_H' < T_H$ for the horizontal scanning period $T_H$ of the original video signals, that is, the time base of the recorded video signals is compressed. In this case, at a reproduction mode, on the contrary, the time base of the reproduced video signals is expanded in the circuit 100b of FIG. 5.

In this way, in accordance with this invention, the time base of the video signals can be easily compressed and expanded without increasing the scale of the circuit. Particularly, for the high definition MUSE (multiple sub-Nyquist sampling encoding) system, this time base compression/expansion makes easy the segment recording and tracking control. This will be explained below in more detail.

In the high definition MUSE system, as shown in FIG. 13(d), as horizontal synchronizing information, used are so-called positive polarity horizontal synchronizing signals HD not exceeding the maximum amplitude of the video signals, and although not shown, as vertical synchronizing information, similarly used are positive polarity vertical synchronizing signals FP. In recording video signals having such a synchronizing information format, they are recorded after the original video signals as shown in FIG. 13(d) are time-base compressed as shown in FIG. 13(a) and during the blanking periods ($T_B$ shown in FIG. 13(a)) of the video signals, provided by the compression, inserted are, as required, negative polarity horizontal synchronizing signals HX exceeding the maximum amplitude of the video signals, also positive polarity burst signals BX together with the HX, or further negative polarity vertical synchronizing information signals (not shown) together with the HX and BX. In reproducing the video signals, the reproduced video signals as shown in FIG. 13(a) are expanded in their original time base and the above synchronizing information signals HX, BX and VX, thereby restoring the original video signals as shown in FIG. 13(d). Incidentally, the synchronizing information signals as desired can be created by suitably delaying the output pulses from the decoder 405 in FIG. 4 since these output pulses are output with the timings corresponding to the blanking period $T_B$. The burst signals BX, as desired, having a predetermined frequency and period can be created by suitably frequency-dividing the clocks from the terminal 420 on the basis of the synchronizing signals HX. Further, the vertical synchronizing information signals VX can be created on the basis of the output pulses (FIG. 2(k)) from the circuit 410 in FIG. 4 since these pulses are located in the vertical blanking periods $\tau_B$, respectively (or on the basis of the vertical synchronizing information signals VS from the circuit 140 provided by separating the positive polarity vertical synchronizing signals FP included in the original video signals). Therefore, by inserting the synchronizing signals HX, BX and VX thus created into the video signals in the circuit 104, the recorded video signals (FIG. 13(a)) as desired can be provided.

Thus, even in the case where as in the high definition television system, the positive synchronizing information is included and so its separation is difficult at a reproduction mode in the segmented helical scanning, in accordance with the above method of this invention, the synchronous separation is made easy so that the tracking control can be made easy. Any skew which may result from the segmented helical scanning can be completely eliminated so that the stabilized video signals free from time base variations can be properly restored. Thus, even in the high definition television system, the segmented helical scanning and the tracking control can be easily implemented.

In the above embodiments, this invention was applied to a two head helical scanning type VTR to perform a four segmented helical scanning. However, this invention can be applied to a four head helical scanning type VTR in which four heads consisting of two pairs separated from each other by 180° are provided and each pair of heads simultaneously records and reproduces two tracks so as to divide one vertical scanning period into two. This invention can also be generally applied to an n head helical scanning type VTR in which n heads are provided to divide one vertical scanning period into n/2, thereby recording and reproducing every n/2 tracks; in this case, the tracking control have only to be performed for at least one track.

As described above, in accordance with this invention, the tracking control can be always performed, without being influenced by the variation of the rotating speed and rotating phases of the magnetic heads, with high stability, high S/N, sufficient sampling rate, high minuteness and accuracy, and high adaptability. Therefore, this invention permit the video signals to be easily reproduced in different VTR devices, thereby greatly enhancing the reliability of the devices.

What is claimed is:

1. A tracking control device for use in a rotary head magnetic recording/reproducing apparatus in which information signals are recorded on a magnetic tape and reproduced therefrom by rotary magnetic head means comprising:

pulse generator means for generating pulse signals in synchronism with the rotation of said magnetic heads;

a memory with a predetermined storage capacity for temporarily storing said information signal;

means for successively writing said information signals in the memory;

means for successively reading said information signals written in the memory in synchronism with the pulse signals from said pulse generator means and outputting them together with predetermined synchronizing information to successively record them on the slanting tracks of said magnetic tape by said magnetic head means;

a synchronizing information output circuit for separating said synchronizing information from the signals reproduced by scanning the recording tracks of said magnetic tape by said magnetic head means, thereby outputting pulses;

reference pulse creation means for creating reference pulses in synchronism with the pulse signals from said pulse generator means;

phase comparator means for phase-comparing the output pulses from said synchronizing information output circuit with the output pulses from said reference pulse creation means to output signals in accordance with the phase difference therebetween; and control means for controlling said magnetic head means, in response to the outputs from said phase comparator means, so that said magnetic head means can properly scan the recording tracks.

2. A tracking control device for use in a rotary head type magnetic recording/reproducing apparatus, comprising:

means for generating synchronizing signals in synchronism with the rotation of rotary magnetic heads;

mean for converting a time-base of original information signals in which synchronizing information is included;

means for controlling the time-base conversion of said information signals in a predetermined synchronizing relation with said synchronizing signals from said synchronizing signals generating means so as to enable control of the relative speed between a recording medium and said rotary magnetic heads in accordance with said synchronizing information;

means for recording, on said recording medium, said time-base converted information signals;

means for reproducing said information signals on said recording medium;

means for time-base converting the information signals thus reproduced to restore the original information signals; and means for detecting a phase difference between said synchronizing signals from said synchronizing signals generating means and said synchronizing information included in said information signals reproduced by said reproducing means and for controlling the relative speed between said recording medium and said rotary magnetic heads in accordance with synchronizing information included in the recorded information signals to that the time of the phase difference is a predetermined value.

3. A tracking control device according to claim 2, wherein said speed control means comprises:
means for creating driving signals on the basis of the time of said phase difference; and
driver means for controlling said relative speed in accordance with said driving signals.

4. A tracking control device according to claim 3 wherein said driver means comprises means for controlling the travelling speed of said recording medium in accordance with said driving signals.

5. A tracking control device according to claim 3, wherein said driver means comprises means for perturbing said rotary magnetic heads in the direction perpendicular to the scanning direction thereof on the basis of said driving signals.

6. A tracking control device according to claim 5, wherein said perturbation means comprises means for attaching said rotary magnetic heads to a rotating member through a piezo-electric element, and means for applying said driving signals to said piezo-electric element to perturb said rotary magnetic heads.

7. A tracking control device according to claim 2, wherein said speed control means comprises:
counter means for counting high frequency clocks, which is reset by reset signals generated when the count value becomes a predetermined value and by said synchronizing signals;
means for detecting the count value of said counter means and deciding the time of said phase difference from the detected count value;
means for generating driving signals on the basis of the time of the decided phase difference; and
driver means for controlling said relative speed on the basis of said driving signals.

8. A tracking control device according to claim 2, wherein said speed control means comprises:
an up-counter and down-counter for counting high frequency clocks, which are reset and preset, respectively, by reset signals generated when the count value becomes a predetermined value and said synchronizing signals;
means for detecting the count values of said up-counter and said down-counter in synchronism with said reproduced synchronizing information;
means for deciding the time of said phase difference on the basis of the difference between said count values;
means for generating driving signals on the basis of the time of said decided phase difference; and
driver means for controlling said relative speed in accordance with said driving signals.

9. A tracking control device according to claim 2, wherein said information signals are video signals and said synchronizing information is horizontal synchronizing signals.

10. A tracking control device according to claim 2, wherein said information signals are video signals and said synchronizing information is vertical synchronizing signals.

11. A tracking control device according to claim 2, wherein said information signals are digital signals consisting of plural groups of codes each having a required number of bits and said synchronizing information is synchronizing codes each having a predetermined number of bits, inserted in each group of codes.

12. A tracking control device according to claim 2, wherein said means for recording records said time-base converted information signals on slant tracks of said recording medium and said means for reproducing said information signals reproduces said information signals from said slant tracks on said recording medium.

13. A tracking control device for use in a rotary head type magnetic recording/reproducing apparatus in which information signals including synchronizing information with their certain period divided into n blocks (n: and integer of 1 or more) are recorded for each block on n slanting tracks of a magnetic tape by a rotary head and reproduced therefrom, comprising:
means for generating synchronizing signals in synchronism with the rotation of rotary magnetic heads;
means for successively converting the time base of said information signals for each of said n blocks and successively recording them on each of said n tracks of said magnetic tape;
means for controlling the time-base conversion of said information signals in a predetermined synchronizing relation with said synchronizing signals so that said synchronizing information is recorded at positions on said n tracks which are kept in a predetermined phase synchronizing relation with said synchronizing signals from said synchronizing signals generating means so as to enable control of the relative phase between said magnetic tape and said magnetic head means in according with said synchronizing information; and
means for detecting a phase difference between said synchronizing signals from said synchronizing signals generating means an said synchronizing information included in said information signals reproduced from said tracks and for controlling the relative phase between said magnetic tape and said magnetic head means in accordance with said synchronizing information included in said recorded information signals so that the time of the phase difference is constant.

14. A track control method for use in a rotary head type magnetic recording/reproducing apparatus, comprising the steps of:

generating synchronizing signals in synchronism with the rotation of rotary magnetic heads;

converting a time-base of original information signals in which synchronizing information is included;

controlling the time-base conversion of the information signals in a predetermined synchronizing relation with the synchronizing signals generated in synchronism with the rotation of the rotary magnetic heads so as to enable control of the relative speed between a recording medium and the rotary magnetic heads in according with the synchronizing information;

recording, on the recording medium, the time-base converted information signals;

reproducing the information signals on the recording medium;

time-base converting the information signals thus reproduced to restore the original information signals;

detecting a phase difference the synchronizing signals generated in synchronism with the rotation of the magnetic heads and the synchronizing information included in the reproduced information signals; and controlling the relative speed between the recording medium and the rotary magnetic heads in according with the synchronizing information included in the recorded information signals so that the time of the phase difference is a predetermined value.

15. A tracking control method according to claim 14, wherein the step of recording the time-base converted information signals on the recording medium includes recording the time-base converted information signals on slant tracks on the recording medium and the step of reproducing the information signals on the recording medium includes reproducing the information signals on the slant tracks on the recording medium.

* * * * *